3,250,721
PHOSPHATE GLASS FOR LASER USE

Paul F. De Paolis and Paul B. Mauer, Rochester, N.Y., assignors to Eastman Kodak Company, Rochester, N.Y., a corporation of New Jersey
No Drawing. Filed June 27, 1962, Ser. No. 205,539
1 Claim. (Cl. 252—301.4)

This invention relates to a laser material of improved efficiency, the word "laser" referring to "light amplification by stimulated emission of radiation."

The laser action of certain materials has been noted, and reports have been published concerning the use of the intense energy contained in the beam of light from a laser. See, for example, A. L. Schwalow and C. H. Townes, Phys. Rev. 112, 1940 (1958); E. Snitzer, "Optical Maser Action in Barium Crown Glass," Phys. Rev. Letters, vol. 7, #12, Dec. 13, 1961, p. 444; The Wall Street Journal, Friday, April 13, 1962, p. 14; and Time, April 20, 1962, p. 103.

Cross reference is made to our cofiled application, Ser. No. 205,540, on borate lasers containing thorium oxide.

The object of the present invention is to provide greater efficiency and consistent efficiency from one melt to the next, by utilizing materials in which the atoms arrange themselves to provide what is apparently greater symmetry of electrical field at the lasing ions.

As will be described in more detail hereinafter, these advantages are achieved according to the invention by a laser material incorporating $Nd_2O_3$ in quantity of about 0.1 to 10% by weight of the total of the other components in a phosphate glass. Such laser glasses (phosphate base) according to the invention have a fluorescent efficiency about one order of magnitude greater than (about 10 times that of) a similar glass with borate base.

While we do not desire to be bound by any particular theory, it is believed that the following may explain and document the superior properties of the material as a laser according to this present invention.

(1) *Presence of highly polarizable ions.*—This allows the rare-earth fluorescent impurity to conform the oxygen ions in its neighborhood to more symmetrical sites.

(2) *High oxygen content.*—This is afforded by not using monovalent metals such as sodium, and by replacing boron with phosphorus. As calculated below, the oxygen to metal ion ratio in the phosphate glass is between 2.0 and 2.5. This relatively high oxygen content increases the probability that an impurity ion will be completely surrounded by oxygen, again increasing the symmetry of the electrical field acting on the ion.

(3) The measured fluorescence intensity of a neodymium ion impurity in this phosphate glass is found to be comparable to or better than the fluorescence of the same ion in a calcium fluoride crystal. Since lasing action involves chain reaction fluorescence, an increase in fluorescence tends to increase the output of a laser.

A typical laser composition having the advantages of the present invention is as follows:

Example 1

|  | Wt. | Wt. percent | Mols | Mol percent | M (metal) | O (oxygen) |
|---|---|---|---|---|---|---|
| $La_2O_3$ | 20 | 13.4 | .0415 | 6.6 | 13.2 | 19.8 |
| BaO | 35 | 23.4 | .1525 | 24.3 | 24.3 | 24.3 |
| $P_2O_5$ | 90 | 60.3 | .4250 | 67.7 | 135.4 | 338.5 |
| $Nd_2O_3$ | 4.3 | 2.9 | .0086 | 1.4 | 2.8 | 4.2 |
|  |  |  |  |  | 175.7 | 386.8 |

Ratio $O/M=2.2$. Total $O+M=562.5$. Neodymium population$=2.8/562.5$ or, about one neodymium atom per 200 matrix atoms.

The fine optical homogeneity of these materials and their ease of fabrication into rods renders them particularly desirable for laser use. A typical laser rod is approximately ¼″ in diameter and 2″ long, with polished semi-reflecting ends which are usually flat and parallel, but which in some lasers are curved.

For ease in visualizing the crystal lattice, it is pointed out that one Nd atom per 200 matrix atoms means that on the average, there are about 5 matrix atoms between each pair of Nd atoms, in any direction; the cube root of 200 is about 6.

The essential constituents of this laser glass, in order to gain the advantages of the present invention, are the phosphate and the neodymium. The oxides of other metals which metals have a valence of 2 or more may be substituted for the barium and lanthanum oxides. For example either may be replaced in whole or in part by thorium oxide, tantalum oxide, tungsten oxide or strontium oxide.

For comparison it is pointed out that in borate base glasses the number of atoms of oxygen exceeds that of the metal atoms usually by about 1.4:1, whereas in the present invention, the number of oxygen atoms is between 2 and 2.5 times that of the metal atoms.

The invention has been described in detail with particular reference to a preferred embodiment thereof, but it will be understood that variations and modifications can be effected within the spirit and scope of the invention as described hereinabove and as defined in the appended claim.

We claim:
A laser material which is a glass formed by fusion of a batch having substantially the following composition:

Percent by wt.
$La_2O_3$ ------------------------------------ 14
BaO ------------------------------------ 23
$P_2O_5$ ------------------------------------ 60
$Nd_2O_3$ ------------------------------------ 3

References Cited by the Examiner

UNITED STATES PATENTS

| 2,116,633 | 5/1938 | Long | 106—47 |
| 2,278,501 | 4/1942 | Tillyer et al. | 106—47 |
| 2,544,460 | 3/1951 | Kreidl | 106—47 |

FOREIGN PATENTS

| 338,334 | 11/1930 | Great Britain. |
| 412,110 | 6/1934 | Great Britain. |

OTHER REFERENCES

Pringsheim: "Fluorescence and Phosphorescence," published 1949, by Interscience Publishers of New York City (pages 474–478).

Snitzer: "Optical Maser Action in Barium Crown Glass," Phys. Rev. Letters, volume 7, Dec. 13, 1961 (page 444).

Vickery et al.: J. American Ceramic Society, October 1958, "Density Studies on the Function of Rare-Earth Ions in Glass Matrices" (pages 422–426).

TOBIAS E. LEVOW, *Primary Examiner.*

H. McCARTHY, *Assistant Examiner.*